Patented Jan. 7, 1941

2,227,533

UNITED STATES PATENT OFFICE 2,227,533

CORK COMPOSITION

Giles B. Cooke, Baltimore, Md., assignor to Crown Cork & Seal Company, Inc., Baltimore, Md., a corporation of New York No Drawing. Application May 16, 1938,
Serial No. 208,319

3 Claims. (Cl. 260—742)

The present invention relates to a new composition having as its principal ingredients hydraulic or colloidal cement, comminuted cork such as cork granules and fines, and a rubber solution preferably in the form of a latex dispersion. I have discovered that if these components are combined in controlled amounts a product is obtained having numerous applications. The new material is characterized by moisture and heat resistance, thermal and sound insulative qualities, and is not affected by weak acids and alkalies or brines. Moreover, while quite rigid, the product possesses appreciable properties of flexibility and resiliency and exhibits under load, marked compression and rebound. Also the product of this invention possesses adhesive qualities in that it will adhere readily to metal such as iron, steel, brass and non-ferrous metals, as well as to wood, cement and concrete.

While latex or rubber compositions with cement, namely alumina or Portland cement are well known, they have not been developed to possess the various properties above mentioned. I have discovered that by including in a cement-rubber mixture a suitable amount of comminuted cork, that an entirely different type of product is obtained from the usual cement rubber mixture. In this new product the cork is an active or positive constituent. That is to say, the cork becomes distributed throughout the mix and while not interfering with the rigidity of the cement or the bond created by the presence of the cement and the rubber, is so uniformly dispersed and is present in such amount as to flexibilize and render the final product resilient so that it does not readily fracture. This is important in connection with flooring where cracking, due to brittleness or to weakening of the bond between the ingredients of the composition flooring, has always constituted a major difficulty. Of course, the rubber contributes to this resistance to cracking, but it is not so permanent in its resistance to oxidation or disintegration as cork and its use while necessary must be controlled. Without the use of cork, either the rubber content must be substantially increased to an objectionable amount, or resiliency and flexibility must be sacrificed in favor of rigidity by using a large proportion of cement.

Stated another way, the composition product made in accordance with this invention possesses characteristic cork properties which do not interfere with the function of the rubber or of the cement, but in fact make it possible to use both of these substances and obtain rigidity, with resiliency and flexibility without cracking and without disintegration in the presence of heat, moisture and similar conditions which are encountered, for example, in the case of a cement flooring composition.

In the manufacture of the improved cork rubber cement composition, I have discovered that it is necessary to avoid premature coagulation of the latex due to the presence of the cork or the cement, as well as premature setting of the cement and to this end, there is included in the mix a stabilizer. This agent is present in sufficient amount to assure that upon setting up of the composition, whereby the cement hardens and the rubber coagulates, the uniformity of the mixture is not disturbed. That is to say, there is no separating out of one component from another and the final product is free of any clumps or bunches or cork or segregated portions containing undispersed cement or rubber. Hence, the final product has a uniform consistency.

In carrying out the invention, there is first prepared a rubber composition consisting of a rubber solution such as a latex dispersion. I prefer a latex dispersion of low concentration, e. g., 40 to 50% rubber. To this dispersion, is added sulphur, as a vulcanizing agent, a suitable accelerator such as "captax," butyl zimate or "Tuads" as well known in the art, an activator such as zinc oxide, and if desired a suitable pigment, e. g., lampblack. I also add to the rubber solution a small amount of a stabilizer such as triethanolamine and then, if necessary, suitably dilute the solution by means of an appropriate quantity of water.

Thereafter, depending upon the character of the final product desired, there is added a suitable proportion of cork, and a filler or bulking aggregate such as sand or gravel. The mix is in a fluid state and is now in condition to receive the cement which is preferably a high alumina cement, although Portland cement and other conventional cements may be used as desired.

The amount of water added to or present in the mix (due to the aqueous dispersion of latex), as mentioned above, will be controlled depending upon whether a relatively fluid or pourable mix is desired for filling in cracks in flooring or roadways, for example, at the expansion joint, or whether a troweling consistency is desired for laying a flooring or wall after the manner of conventional plaster, or whether a highly plastic or moldable composition is required.

The mixing operations are all conducted under atmospheric conditions of temperature and pressure, and the mixing is carried out in a manner to avoid the generation of any excess frictional heat. As will be appreciated, heat will in some cases interfere with the setting qualities of the product.

While we have referred herein to rubber solutions, preferably a latex dispersion, it is to be understood that the term "rubber solution" is meant to include solutions of true rubber such as raw rubber and reclaimed rubber. Solutions of synthetic rubbers, for example, "Duprene" (chlorobutadiene) and "Thiokol" (an olefin polysulphide reaction product) can also be used. The synthetic rubbers are particularly advantageous in cases where natural rubber is subject to disintegration or solution, e. g., in circumstances where the product comes in contact with rubber solvents and oils.

The vulcanizing agents, accelerators, activators, retarders, pigments and other constituents may be of any conventional type and are used in amounts to form the desired product. In this connection, vulcanization is conducted in situ without recourse to heating and the rate of vulcanization is suitably controlled by the atmospheric temperature and the accelerators employed.

If desired, the vulcanizing agent and accelerator can be added after the mix is made up, for example, at the time of or location where the mix is to be used. If this is not desired, in some cases a suitable anti-oxidant or vulcanization retarder such as "Dupont Retarder W" may be added to the mix prepared as heretofore described.

In regard to the stabilizing agent, I prefer to use triethanolamine, casein or ammonia, but other compounds may be employed so long as they have the property of retarding coagulation of the latex in the presence of cork and cement and afford a control whereby the setting up of the cement and the coagulation of the latex is substantially coextensive and simultaneous.

Relative to the cork employed, it may be of uniform size, in particles, granules, fines or dust, or there may be, for example, a mixture consisting of a portion of fines or dust such as will pass through a fifty mesh screen and a portion of coarser granules or particles, for example, a size which will be retained on a 20 and pass through a 5 mesh screen. The important conditions surrounding the use of cork are that it be uniformly dispersed and present in amount relative to the rubber and cement to impart its properties to the final product and afford flexibility such as will substantially preclude the customary danger of cracking and impart resiliency to augment the compression and rebound afforded by the presence of the rubber.

As stated, the mineral aggregate, i. e., sand or gravel employed is used as a filler and will be present in amount to lend the desired body and weight to the composition. In some cases the sand can be eliminated but I prefer to use it since it adds to the hardness of the product and is economical from the production standpoint.

Example I

A preferred example of a product of this invention is prepared by using the following:

| | Pounds |
|---|---|
| 1. Latex (40 to 50% rubber), 60 to 75 lbs. rubber solids | 150 |
| 2. Cork (insulation fines) | 20 |
| 3. Gravel and sand (⅛ to 1/16) | 200 |
| 4. Cement (Luminite) | 200 |
| 5. Sulphur | 6 |
| 6. "Tuads" | 2 |
| 7. Zinc oxide | 3 |
| 8. Lampblack | 5 |
| 9. Triethanolamine | 2 |

Example II

In order to make a harder composition the volume proportions of the above (Example I) are changed as follows:

| | Volumes |
|---|---|
| 1. Latex (substantially ½ volume rubber solids) | 1½ |
| 2. Cork | 1 |
| 3. Gravel | 1½ |
| 4. Cement | 1½ |

The remainder of the ingredients of the mixture are substantially the same.

Example III

A further example consists of the following:

| | Grams |
|---|---|
| 1. Latex (55% rubber) 105 grams rubber solids | 190 |
| 2. Sulphur | 6 |
| 3. Accelerator | 2 |
| 4. Zinc oxide | 3 |
| 5. Lampblack | 6 |
| 6. Triethanolamine | 5 |
| 7. Cork (fine) | 10 |
| 8. Cork (⅛) | 10 |
| 9. Sand or gravel | 150 |
| 10. Cement | 250 |

It is to be observed that in each of the compositions a suitable stabilizer, for example, triethanolamine, is employed and in cases where it is desired to retard vulcanization a suitable retarding agent, as well known in the art, can be included.

The presence of the cork is important in that it not only adds flexibility and resiliency to the product but in addition aids the setting properties of the composition by reason of its ability to coagulate the rubber dispersion. In addition, the cork particles which are uniformly dispersed throughout the composition, are present at the surface to afford a resilient frictional contact surface.

In respect to the cement employed, this is usually in greater amount than the latex and in amount equal to or greater than the amount of the filler. The cement is present to give the desired rigidity, strength and bonding properties to the final product.

I have indicated, in Examples I and II above, the preferred compositions. However, the cement may be in lesser or greater amount and will usually be within the range of from 150 grams to 300 grams. With respect to the amount of sand or gravel, this will vary depending upon the product, but will, for most cases, be present in the amount of from 100 to 200 grams. The cork will in like manner vary, and satisfactory products will be obtained when the cork is present in amount between 15 grams and 50 grams. The rubber solution content may be varied from between 100 to 300 grams, i. e., 40 to 165 grams of solids.

The composition is workable, i. e., is made fluid for filling and pouring purposes whereas for spreading purposes it is in the form of a plastic mass of a troweling consistency and for molding will have increased plasticity as required. Whether in its fluid or plastic state, there is present a very uniform dispersion of the components by reason of the presence of the stabilizer and this dispersed relation is maintained in the setting up of the mix so that the final product is of uniform density and consistency.

A preformed product may be manufactured for certain purposes, namely floorings and airplane runways, and laid as a tile. In other cases the material is troweled or poured at the point of use and is allowed to set under normal temperature conditions in situ. In this connection, while I do not prefer to set the composition by heating it, in some cases this may be resorted to.

In addition to various uses outlined herein, the product of this invention may be used as an expansion joint or for the repair of already existing expansion joints. This is possible because the cork is present in amount to afford the desired compression and rebound.

While I have referred herein to sand and gravel, e. g., the bulking mineral aggregate, it is to be understood that other mineral products may be utilized either to impart color or for other purposes. Thus asbestos fibers might be used either alone or in combination with a mineral aggregate.

I have described herein preferred compositions and methods of manufacture but it is to be understood that modifications and changes may be resorted to within the concept of the invention, and are considered to be comprehended within the scope of the appended claims.

I claim:

1. A composition of matter comprising substantially 150 to 300 grams of hydraulic cement; 100 to 200 grams of mineral aggregate; 15 to 50 grams of comminuted cork, and from 40 to 165 grams of a material selected from a group consisting of rubber deposited from rubber latex, reclaimed rubber, raw rubber, polymerized chlorabutadiene and an olefin polysulfide reaction product.

2. A composition of matter comprising substantially one volume of comminuted cork, 1½ volumes of mineral aggregate, 1½ volumes of hydraulic cement, and 1½ volumes of an aqueous solution of latex containing the rubber in 40 to 50% concentration.

3. A composition of matter comprising substantially 150 to 300 grams of hydraulic cement; 100 to 200 grams of mineral aggregate; 15 to 50 grams of comminuted cork, and from 40 to 165 grams of a material selected from a group consisting of rubber deposited from rubber latex, reclaimed rubber, raw rubber, polymerized chlorabutadiene and an olefin polysulfide reaction product, said material being vulcanized.

GILES B. COOKE.